March 8, 1955  N. H. NYE ET AL  2,703,612
APPARATUS FOR CUTTING SHEETS OF PLASTIC FILM
Filed April 25, 1951  2 Sheets-Sheet 1

Inventors
Clarence C. Ensinger
Charles H. Sorrick Jr.
Ralph W. Penn
BY  Norman H. Nye Oldham & Oldham
ATTORNEYS

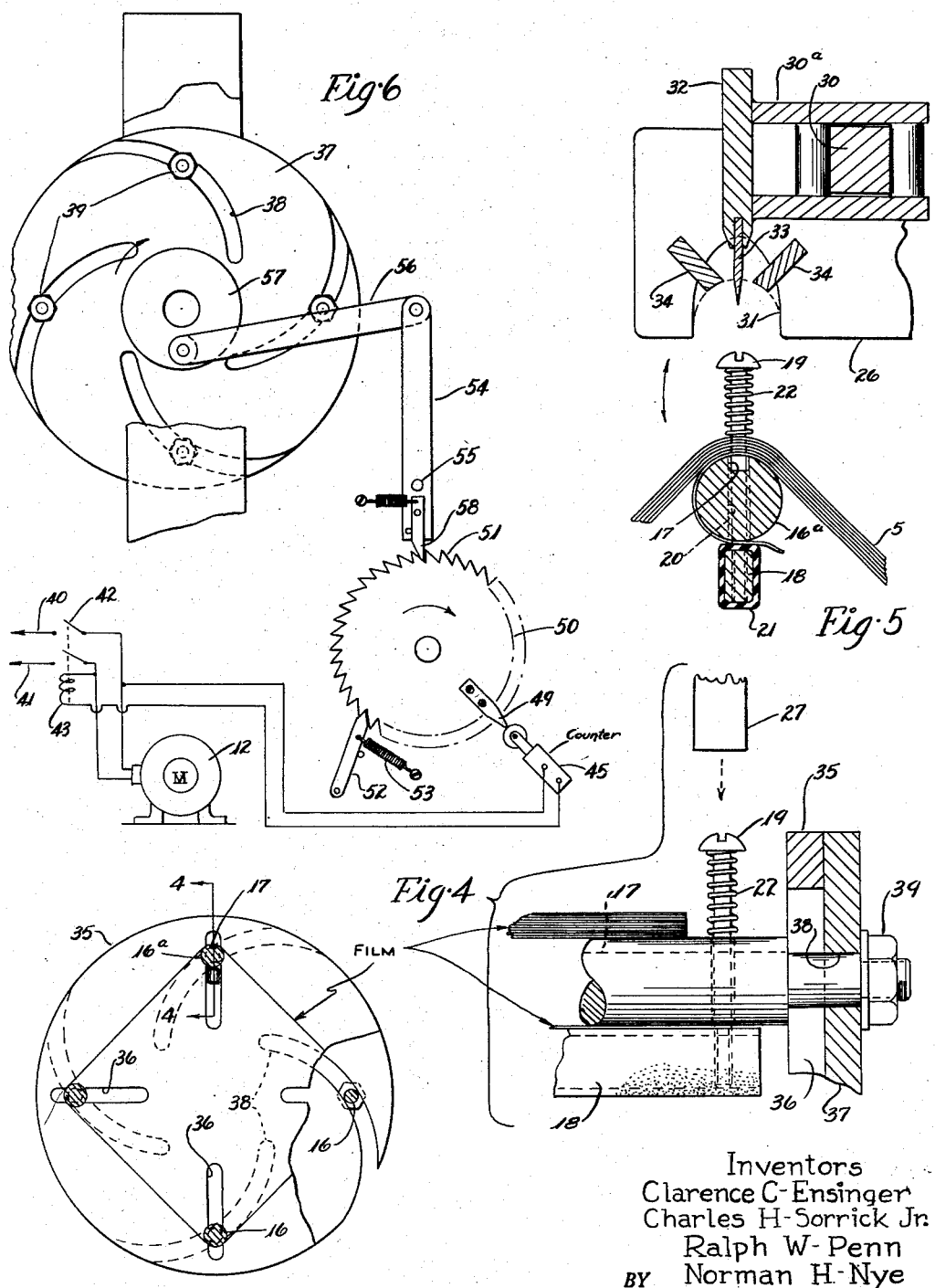

United States Patent Office 2,703,612
Patented Mar. 8, 1955

2,703,612

APPARATUS FOR CUTTING SHEETS OF PLASTIC FILM

Norman H. Nye and Ralph W. Penn, Cuyahoga Falls, and Clarence C. Ensinger and Charles H. Sorrick, Jr., Kent, Ohio Application April 25, 1951, Serial No. 222,828

7 Claims. (Cl. 164—42)

This invention relates to apparatus for cutting sheets of material such as plastic film, and especially to apparatus that is adapted to cut a plurality of pieces of plastic film from an elongate plastic film sheet, simultaneously, with such individual pieces being of at least substantially the same length.

In processing and treating elongate sheet material, such as plastic film sheets made from cellophane, Pliofilm, or other substances, such as vinyl plastics or the like, is frequently is necessary to cut such plastic sheet into a plurality of small strips or sheets, each of which is at least of substantially the same size. Various types of apparatus for such action, or generally similar operations, have heretofore been proposed but are not particularly suitable for use in the efficient, convenient production, rapidly, of a plurality of substantially equal size pieces of material from a long strip of same.

The general object of the present invention is to provide an apparatus of the class described which is characterized by its rapid, convenient, low-cost operation and which apparatus is of relatively inexpensive, uncomplicated, construction.

Another object of the invention is to provide a reel for apparatus of the class described which reel has a readily adjustable diameter and is adapted to have a plurality of convolutions of a plastic film or similar material wrapped therearound for convenient severance into a plurality of equal size pieces of material.

Another object of the invention is to provide apparatus of the class described wherein an end of a strip of material can be easily threaded into engagement with a rotatable reel and be clamped into engagement therewith.

A further object of the invention is to provide reeling and winding apparatus of the class described wherein a part of the strip of material to be cut into sections secured to the apparatus is released from engagement by the apparatus simultaneously with the severance of a plurality of convolutions of the materal into separate sheets.

Yet another object of the invention is to provide an automatically controlled winding and reeling apparatus that will shut itself off upon a predetermined number of convolutions of material being wound upon the reel.

Another object of the invention is to provide a winding reel with easily operated accurate means for cutting sheet material wound on the reel into sections of equal length.

The foregoing and other objects and advantages of the invention will be made more apparent as the specification proceeds.

For a better understanding of the present invention, attention is directed to the accompanying drawings, wherein:

Fig. 3 is a fragmentary vertical section taken on line 3—3 of Fig. 2;

Fig. 4 is a fragmentary transverse vertical section taken on line 4—4 of Fig. 3;

Fig. 5 is a fragmentary vertical section taken on line 5—5 of Fig. 2; and

Fig. 6 is a special fragmentary side elevation and diagrammatic wiring diagram of the counter mechanism and drive motor of the apparatus.

Figures 1, 2:
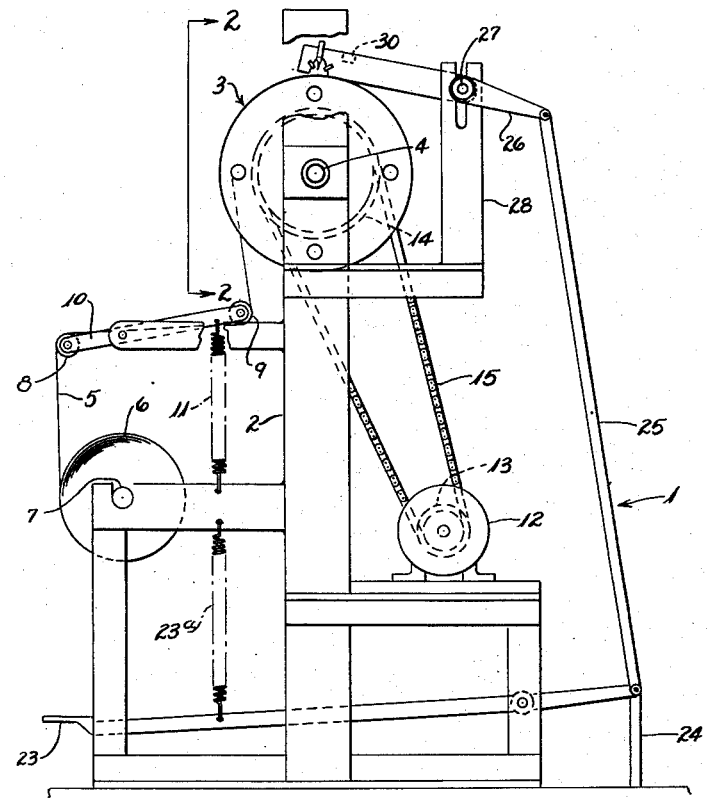
Fig. 1 is a side elevation, partially broken away, of apparatus embodying the principles of the invention.
Fig. 2 is a partial front elevation of the apparatus of Fig. 1 taken on line 2—2 thereof.

The present apparatus, broadly speaking, resides in the provision of a novel winding and reeling apparatus including a reel, including an end plate and cam plate at each end thereof with radially extending circumferentially spaced slots formed in the end plates and with arcuately extending slots in circumferentially spaced portions of the cam plates receiving reel bars therein and extending through overlying portions of the slots in the end and cam plates for radial movement upon relative arcuate movement between the end and cam plates, a frame journalling the reel thereon, means for rotating the reel a predetermined number of times and automatically shutting it off upon the completion of such number of rotations, means for securing a strip of material to the reel, a cutter bar for cutting any material on the reel, means for supporting the cutter bar and moving it into engagement with the reel, and means carried by the cutter bar supporting means to engage and release the strip material securing means, so that a predetermined number of convolutions of strip material may be placed upon the reel and then be severed simultaneously into a plurality of separate strips.

For a complete understanding of the invention, reference should be had to the details of the structure shown in the drawings, and a winding and reeling apparatus is indicated in general by the numeral 1. The apparatus 1 includes a frame 2 on which an adjustable diameter reel, indicated as a whole by the numeral 3, is suitably journalled, as through a support shaft 4 protruding from each end of the reel 3. Usually suitable means are associated with the apparatus of the invention for supplying a continuous sheet or strip of a plastic film material, of a conventional composition to the reel 3, and a strip 5 is shown in Fig. 1 with a roll 6 of such strip material being carried by a shaft 7 journalled on a portion of the frame 2. Usually the strip 5 extends around tension rollers 8 and 9 that are carried by and extend between pivot arms 10 suitably pivoted on a portion of the frame 2 and urged downwardly adjacent the lower part of the reel 3 by means of coil springs 11 or similar means so that a desired tension is maintained upon the strip 5 as it moves from the roll 6 to the reel 3. The reel 3 may be rotated by any conventional means and a motor 12 is shown carried by the frame 2 for this purpose. An output pulley 13 of the motor 12 is connected to a drive pulley 14 for the reel 3 by means of a suitable belt 15 connected therebetween. This drive pulley 14 usually is carried by a portion of the shaft 4 protruding through part of the frame 2.

An important feature of the present invention resides in the novel means used to clamp an end or other portion of the strip 5 to the reel 3. The reel 3 includes a plurality of reel bars 16 that extend transversely thereof and one reel bar 16a is provided with a slot or notch 17 at one surface thereof for a purpose to be hereinafter described. A clamp bar 18 is shown secured to the reel bar 16a by means of a pair of cap screws 19 that extend through holes 20 in the reel bar 16a and which are in threaded engagement with the clamp bar 18. Usually the clamp bar 18 has a suitable plastic or rubber coating 21 thereon to aid in setting up a frictional grasp for any materials received between the clamp bar 18 and the adjacent peripheral surface of the bar 16a. Normally coil springs 22 are telescoped over each of the cap screws 19 to urge such cap screws 19 radially outwardly with relation to the bar 16a and the reel 3. Fig. 5 of the drawings best shows that the clamp bar 18 is on the radially inner surface of the bar 16a, and rotation of the reel 3 will deposit a plurality of convolutions or layers of the strip 5 on the reel 3, as also indicated in Fig. 5.

Actual release or clamping of a strip of material by the clamp bar 18 is controlled by means of a foot treadle 23 (Fig. 1) that is pivoted on a lower part of the frame 2 and has a floating support leg 24 provided for one end thereof. This support leg and treadle 23 have a common pivotal connection with a connector link 25 which in turn is pivotally connected to a bridging bar connecting the back ends of a pair of lever arms 26 pivotally mounted on opposite sides of the upper portion of the frame 2. Usually the lever arms 26 are supported intermediate their ends by pins 27 that are vertically adjustably secured to brackets 28 on the upper portion of the frame 2. This pair of lever arms 26 is secured together at their front ends by a carrier bar 30. The lever arms 26 are in alignment with the cap screws 19 and are notched at 31 to fit around the cap screws and bar 16a. Hence, upon depression of the treadle 23 against the action of spring 23a, the forward portion of the lever arms 26 are depressed or moved towards the reel 3, which brings the notches 31 into engagement with the tops of the cap screws 19 and pushes them inwardly with relation to the reel bar 16a whereby the clamp bar 18 is pushed away from engagement with the surface of reel bar 16a. The provision of the resultant space between the clamp bar and reel bar either releases a strip of material initially engaged therewith, or else permits the ready insertion into such space of the end of a strip of material. Release of the foot treadle 23 causes the lever arms to move back up to their out of the way initial position under action of spring 23a, thereby allowing clamp bar 18 to grip the strip end against the reel bar 16a.

The carrier bar 30 slidably supports a carriage 30a to which is fastened a block 32 (Fig. 5) which has a knife 33 suitably secured thereto. Thus, upon downward movement of the treadle 23, the knife 33 is brought down adjacent the reel bar 16a and into cutting relationship with any convolutions of the strip 5 wound upon the reel 3. The recesses 31 on the lever arms 26 engage the reel bar 16a and hold the reel 3 against rotation when a cutting action is to be performed on material carried thereby. During the cutting operation, the operator slides the carriage 30a laterally on the bar 30 and the knife 33 extending down into the slot 17 effectively cuts the convolutions of plastic strip. Guides 34 may also be carried by and extend between the lever arms 26 adjacent the knife 33 to aid in retaining adjacent portions of convolutions of the strip 5 on the reel 3 firmly in position while the cutting operation is being performed thereon. Cutting through the convolutions of the strip as described severs it into a plurality of separate sheets, each of which is of substantially the same size within the differences in circumference of the inner and outer convolutions of material formed on the reel 3.

In order that the apparatus of the invention is adjustable as to the length of the sheets that can be cut thereby, the reel 3 is provided with a variable diameter. For this purpose, an end plate 35 is provided at each end of the reel 3 and it has a plurality of radially directed, circumferentially spaced slots 36 formed therein. Each end plate has a cam plate 37 associated directly therewith and arcuately extending slots 38 are formed in the cam plate 37 with the same number of slots being formed in each of the end and cam plates and with the slots being so positioned that portions of the slots 36 and 38 can be placed in overlying or intersecting relation. The ends of the reel bars 16 and 16a extend through aligned portions of the slots 36 and 38 and may be fixed in engagement therewith as by means of nuts 39 engaged with the ends of such bars for tightly securing them to the reel. Fig. 3 clearly shows that the slots 36 are formed in the end plates 35 in the radially outer portions thereof but with such slots being completely within the confines of the end plate to limit movement of the bars 16 and 16a. The slots 38 extend from a peripheral portion of the cam plate arcuately inwardly therefrom. Since the reel bars 16 and 16a extend through parts of the slots in each of the end and cam plates, it will be seen that simultaneous radial movement of these reel bars is secured by varying the angular relationship between the different end and cam plates. This motion can occur as soon as the nuts 39 are loosened and may be effected in any desired manner, as, for example, by the operator grasping a reel bar 16 near its ends and moving the bar radially.

A suitable source of electric power is adapted to be connected to motor 12 and power supply leads 40 and 41 for this purpose are shown in Fig. 6 of the drawings. A lock-in push button switch 42 is provided in the leads 40 and 41 which has a lock-in coil 43 which holds the switch 42 closed once the switch is pushed. When the switch 42 is closed, the motor 12 operates to wind the desired number of convolutions of plastic strip on the reel. Opening the limit switch 45 which is normally closed and connected in series with the coil 43 stops the motor 12.

The limit switch 45 is opened by means of a finger 49 carried on a counter disc 50 which has a plurality of notches 51 provided on its periphery. A lock arm 52 is resiliently held by a control spring 53 against the counter disc 50 to limit its movement to clockwise rotation. The counter disc 50 is rotated notch by notch in a clockwise direction by means of a control arm 54 which is pivotally secured intermediate its ends usually to the frame 2 as by means of a pin 55. The upper end of the control arm 54 is connected to a link 56 which is itself pivotally secured to a collar-crank 57 mounted on the end of the reel shaft 4. Thus, with each rotation of the reel 3 and consequent deposition of a convolution of the strip 5 thereon, the arm 54 is swung through an arc and an actuating finger 58 carried thereby in turn engages one of the notches 51 of the counter disc 50 to advance such counter disc one notch. Of course, the counter disc 50 can be set in any predetermined position with relation to the limit switch 45 or may be formed with any desired number of notches, for example, fifty, so that a predetermined number of convolutions of material are accumulated upon the reel 3 before the motor 12 is shut off automatically by the finger 49 contacting and opening the switch 45. It should be noted that the finger 49 moves on by or coasts on by the limit switch 45 after opening it so that it is closed when the apparatus is next started by pushing switch 42. After the motor 12 stops, the operator turns reel bar 16a into alignment with the notches 31 of arms 26 to allow the cutting operation to be performed.

After the selected number of convolutions of plastic strip are wound on the reel and the reel is automatically stopped as described, then the convolutions are cut off the reel. This is achieved as previously explained in detail by the operator stepping on foot treadle 23 to bring the cutter carriage 30a into operative relation with reel bar 16a. The operator then moves the carriage 30a along the reel bar 16a to cut the convolutions of plastic strip into a pack of sheets which he catches in his other hand and places on a table at one side of the apparatus.

It will be realized that the apparatus of the invention may be used with any sheet material of the character described, and that such sheet may be supplied to the reel 3 in any conventional manner.

While one complete embodiment has been disclosed herein, it will be appreciated that modification of this particular embodiment of the invention may be resorted to without departing from the scope of the invention as defined by the appended claims.

What we claim is:

1. A winding and reeling apparatus comprising a reel; including an end plate and cam plate at each end of said reel with radially extending circumferentially spaced slots being formed in the end plates and with similarly spaced arcuately extending slots in circumferentially spaced portions of the cam plates, reel bars received in said slots and extending through overlying portions of the slots in the end and cam plates for radial movement upon relative arcuate movement between the end and cam plates; a frame journalling said reel thereon; means for rotating said reel a predetermined number of times and automatically shutting it off upon the completion of such number of rotations; means for securing a strip of material to said reel; a cutter bar for cutting any material on said reel, means for supporting said cutter bar and moving it into engagement with said reel to cut material thereon; and means carried by said cutter bar supporting means to engage and release the said strip material securing means so that a predetermined number of convolutions of strip material may be placed upon said reel and be severed simultaneously into a plurality of separate strips which are all released from the apparatus, said cutter bar supporting means contacting said strip securing means and moving them to an inoperative position by said cutter bar supporting means being moved to a position at least immediately adjacent said reel.

2. A winding and reeling apparatus comprising a reel for receiving a plurality of convolutions of sheet material thereabout, including an end plate and cam plate at each end thereof with radially extending circumferentially spaced slots formed in the end plates and with similarly spaced arcuately extending slots in circumferentially spaced portions of the cam plates receiving reel bars therein and extending through overlying portions of the slots in the end and cam plates for radial movement upon relative arcuate movement between the end and cam plates, a frame journalling the reel thereon, means for rotating the reel a predetermined number of times and automatically shutting it off upon the completion of such number of rotations for winding a plurality of convolutions thereabout, means for securing the leading end of a strip of material to the reel, a cutter bar for cutting any material on the reel, means for supporting the cutter bar and moving it into engagement with the reel to cut material thereon and means on said cutting bar support and engageable about a bar of said reel to lock said reel against rotation during a cutting operation.

3. A winding and reeling apparatus comprising a rotatable reel, including an end plate and cam plate at each end thereof with radially extending circumferentially spaced slots formed in the end plate and with arcuately extending slots in circumferentially spaced portions of the cam plates, said slots having axially aligned portions therein, reel bars extending through overlying portions of the slots in the end and cam plates for radial movement upon relative arcuate movement between the end and cam plates; means for securing a strip of material to the reel; a cutter bar for cutting any material on the reel; means for supporting the cutter bar and moving it into engagement with the reel; and means carried by the cutter bar supporting means to engage and release the strip material securing means, said last-named means being operative when said cutter bar supporting means position said cutter bar slightly spaced from material on said reel.

4. Apparatus for cutting strip material into a plurality of strips of even lengths, which apparatus comprises an adjustable diameter reel, a frame journalling said reel thereon, means for supplying strip material to said reel, means for rotating said reel, means for securing the strip material to said reel, a cutter bar for transversely cutting strip material on said reel, means for moving said cutter bar into engagement with said reel, and means carried by said cutter bar moving means for engaging and releasing said strip material securing means, said last-named means being operative when said cutter bar moving means position said cutter bar slightly spaced from material on said reel.

5. Apparatus for cutting strip material into a plurality of even lengths, which apparatus comprises a reel, a frame journalling said reel thereon, means for rotating said reel, means for securing the leading end of a strip of material to said reel, a cutter bar for cutting any strip material on said reel, means for supporting said cutter bar and moving same into engagement with said reel, and means carried by said cutter bar supporting and moving means for locking said reel against rotation during a cutting operation and simultaneously releasing the means securing the leading end of the strips to said reel.

6. Apparatus for cutting strip material into a plurality of even lengths, which apparatus comprises a rotatable reel for winding a strip of material thereabout, clamping means for securing a strip of material to said reel, a cutter bar for cutting any strip material on said reel, means for supporting said cutter bar and moving same into engagement with said reel, and means carried by said cutter bar supporting and moving means including clamping means for engaging the material adjacent the line of the cut and means for engaging and locking said reel against rotation for simultaneously releasing the leading end of the strip from the first said clamping means.

7. Apparatus for cutting plastic strip into sheets including a reel, means for supplying strip to the reel, means on the reel for clamping the end of the strip to the reel, means for rotating the reel to wind a plurality of convolutions of strip on the reel, means for automatically stopping the reel when a selected number of convolutions have been wound on the reel, cutter means spaced from the reel during the winding of the convolutions on the reel, means for effecting relative movement between the cutter means and reel to bring them into proximity, a knife holding carriage on the cutter means and movable laterally thereof to slice the convolutions of plastic strip into a pile of sheets, and means operated by the movement of the reel and cutter means into proximity for releasing the means clamping the end of the strip.

References Cited in the file of this patent

UNITED STATES PATENTS

| | | |
|---|---|---|
| 39,862 | Hansell et al. | Sept. 8, 1863 |
| 109,767 | Schuyler | Nov. 29, 1870 |
| 808,578 | Rottinger | Dec. 26, 1905 |
| 813,743 | Scholfield | Feb. 27, 1906 |
| 1,115,586 | Schwab | Nov. 3, 1914 |
| 1,204,597 | Skofsrud | Nov. 14, 1916 |
| 1,542,082 | Nelson | June 16, 1925 |
| 1,652,095 | Coombes | Dec. 6, 1927 |
| 1,838,011 | St. Peter | Dec. 22, 1931 |
| 1,905,899 | Campbell | Apr. 25, 1933 |
| 1,950,492 | Holmes | Mar. 13, 1934 |
| 2,043,004 | Lloyd et al. | June 2, 1936 |
| 2,220,256 | Martindell | Nov. 5, 1940 |
| 2,321,146 | Jones | June 8, 1943 |
| 2,390,894 | Morse | Dec. 11, 1945 |
| 2,578,064 | Hammond | Dec. 11, 1951 |